June 12, 1928.

L. ROUANET 1,673,268

SHOCK ABSORBER

Filed May 21, 1924

INVENTOR:
LOUIS ROUANET
BY Francis E. Boyer
ATTORNEY

June 12, 1928. 1,673,268

L. ROUANET
SHOCK ABSORBER
Filed May 21, 1924      3 Sheets-Sheet 2

INVENTOR:
LOUIS ROUANET
BY: Francis E. Boyce
ATTORNEY

June 12, 1928.  L. ROUANET  1,673,268

SHOCK ABSORBER

Filed May 21, 1924  3 Sheets-Sheet 3

INVENTOR:
LOUIS ROUANET
BY: Francis E. Boyce
ATTORNEY

Patented June 12, 1928.

1,673,268

UNITED STATES PATENT OFFICE.

LOUIS ROUANET, OF IVRY-PORT, FRANCE, ASSIGNOR TO COMPAGNIE D'APPLICATIONS MECANIQUES, OF PARIS, FRANCE.

SHOCK ABSORBER.

Application filed May 21, 1924, Serial No. 714,780, and in France June 8, 1923.

In the known types of shock absorbers, the displacement of one arm of the device in all directions in relation to the other arm cannot take place without occasioning a prejudicial separation of the parts in contact between which the friction is exercised, and without considerably modifying the pressure which produces the said friction and causes the braking or damping action of the shock absorber. Further, in the said devices, the relations and the friction are as a rule supported by the axles or pivot pins, this being however an objectionable feature. In the most improved types of these apparatus, means are frequently employed which provide for a theoretically exact adjustment of the friction according to the various conditions of operation of the shock absorbers when mounted upon vehicles or apparatus of greater or less size. The said means, which usually consist of dials bearing numbers and over which a pointer may be moved for ensuring the tension of a compressible element in an accurate manner, are found to be quite exact before the apparatus have been put in use, but in practice it becomes a difficult matter to carry out the adjustment after the wear of the interposed material which is subjected to friction. In certain devices, the wear is taken up by automatic means, but this result cannot be obtained except by exposing certain of the operative parts to flexion stresses, as for instance the discs or plates carrying the arms, or even the arms themselves.

The present invention relates to a device in which the said drawbacks are obviated. The said device is so conceived that its adjustment is substantially invariable, and it is arranged in such manner that it can be mounted in place or removed, and can also be accurately adjusted after use, with great facility.

The said shock absorber is characterized by the fact that it consists of four shells, two of which are united at the base, and the internal set thus formed is surrounded by the other two shells which form the external set. A suitable substance having a determined coefficient of friction and which can be attached to either of the said sets, is interposed between the internal and external sets which are pressed together by means of an elastic device having a long stroke which is disposed between the shells forming the internal set, the friction remaining practically invariable in spite of the wear.

The said elastic device producing the friction is so constructed and standardized that the proper degree of compression is obtained in an exact manner when the bases of the two shells of the internal set are in juxtaposition.

The apparatus is assembled and regulated by means of a pivot pin or a bolt, which extends through the two groups of shells and is not subjected to friction or reactions, since the form of the shells is such that the centering of the device can be obtained in all directions by this means alone. The wear of the interposed material, which results in separating the shells of the internal set, is clearly apparent, and this wear can be taken up according as it takes place, in order to prevent dust and grit from entering the apparatus. The wear is taken up by screwing a nut on the said pivot pin or bolt, without it becoming sufficient for modifying the state of compression of the elastic device, and thus for causing any change in the working of the apparatus; on the other hand, the constant inner pressure is utilized to prevent the said nut from becoming loose.

Means are provided which provide for the lateral motion of the said arms as is necessary for the proper working of the apparatus, and in certain cases independently of the elasticity of the said arms which may be formed in one piece with the shells or suitably secured thereto, with equal facility; said means may be represented by a difference in the diameter of the apertures provided in each group of shells for the passage of the said bolt or pin, or by shoulders formed upon the bolt when the said apertures in the shells are of the same size.

In order that the lateral movements of the arms may be freely effected, the said shells may be given a spherical shape and in this case one may dispose within the hollow sphere which is formed by the internal group of shells, and is secured to one arm of the apparatus, any desired compressible device of a known type which will afford the pressure necessary to produce the friction between the outer surface of the said hollow sphere and the inner surface of the second hollow sphere formed by the outer pair of shells, this being secured to the other arm of the apparatus and properly surrounding the said inner sphere. A spring, having a long stroke can be advantageously placed in the large space in the inner sphere, and it will offer a substantially constant pressure in spite of the appreciable variations in vertical deflection which are caused by the wear of the friction parts.

The spherical form which is preferably adopted for the apparatus will confer upon it a very neat and compact appearance, and the construction is also facilitated, as the apparatus can be manufactured from sheet metal and chiefly by pressing or stamping the same, thus forming symmetrical shells which can be assembled in such manner that the lines of the joint will be situated in a plane passing through the centre of the sphere. The said shock absorber is constructed in order to constitute a ball-joint, thus enabling the relative motion of the two arms in all directions and without separation of the friction parts—thus offering the maximum protection against dust and grit—and also without any possible flexion of the said arms. The braking action is exercised in a constant manner and with the same force irrespectively of the direction and value of the motion of the arms, of the apparatus, so that the damping of the vertical as well as the lateral oscillations is secured in a constant manner.

It is feasible, without danger of gripping, to give the said shells a form which is not exactly that of a sphere, for instance the form of cones of revolution. But in this case it is indispensable to allow an initial play between the two inner shells which constitute the inner member of the ball joint, in order to provide for the displacement necessary for the movement of the ball joint; when new, this may cause a very slight separation between the friction parts, but this drawback tends to diminish with use.

The shock absorber may also consist of four conical shells of like shape which are preferably obtained from sheet metal by pressing.

This disposition is chiefly suitable for constant-pressure shock absorber, but it is obvious that the free space left within the shells of the internal group may serve to contain any suitable means for automatic and progressive variation of the pressure depending upon the displacements of the shock absorber.

The shock absorber according to the invention is further characterized by the special arrangement of its various parts, which provides for the absorption of the thrusts in the direction of the stress without reactions and without friction upon the pivot pin.

The ends of the shock absorber arms can be attached to the mechanical parts which are to be connected together by the shock absorber, by means of a device whose construction resembles that of the shock absorber itself. But one arm is preferably attached by means of an ordianry pivot joint to an axle pin by which the apparatus is properly guided. The entire outfit thus formed is suitably maintained in place while at the same time it is enabled to move in all directions, and the apparatus will operate without abnormal wear of the pivot pins or of the parts attached to the suspended or non-suspended parts which are connected together by the said shock absorber.

One of the arms of the shock absorber may be constituted, at its ends, of conical parts disposed in the same manner as the central parts of the shock absorber, and securing the proper guiding of the apparatus; both arms may obviously be constructed in the same manner, thus providing fixed parts whereby a correct guiding will be ensured, the distortions of the apparatus being herein absorbed, at the ends, by the separation which takes place between the friction parts.

The advantages inherent in the means which have been above mentioned may even be obtained to a certain extent by the use of half of a group of shells, but this construction is less to be recommended both as concerns the appearance of the apparatus as well as from a practical point of view, although it may offer certain advantages where an apparatus of reduced size is desired.

The main features of the shock absorber according to the invention are clearly set forth in the following description and claims with refernce to the appended drawings which are given by way of example.

Figure 1:
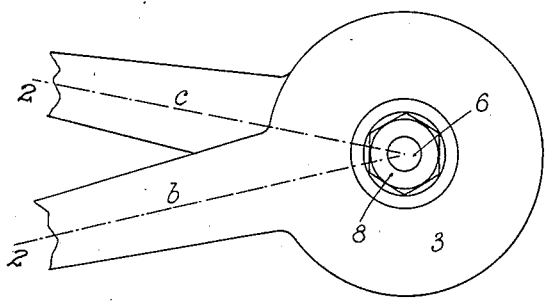
Fig. 1 is a side elevation of the shock absorber according to the invention.
Figure 2:
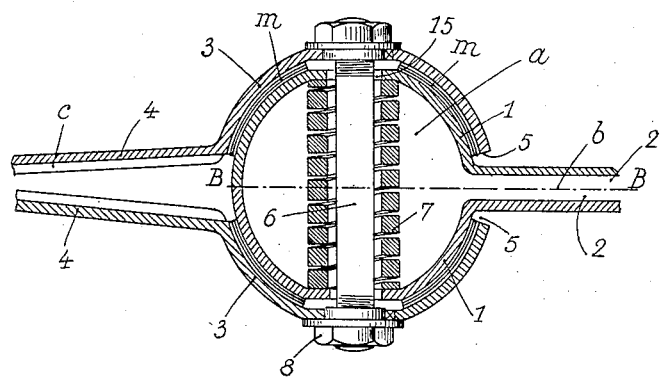
Fig. 2 is an axial cross section on the broken line 2—2 of Fig. 1.

In the construction shown in Figs. 1 and 2, the main body of the shock absorber essentially comprises four shells which are symmetrically disposed in pairs, and the said shells can be made of pressed sheet metal. Each of the two shells of the inner pair comprises a hemispherical part 1 and an extension 2. The two shells are juxtaposed according to plane B—B, and the two hemispherical parts 1 will thus form a hollow sphere $a$ whilst the two extensions 2 form one of the arms $b$ of the shock absorber. Upon the sphere $a$ are disposed the two hemispherical shells of the outer pair 3, each shell comprising the extensions 4 which, when juxtaposed, will constitute the second arm $c$ of the shock absorber.

A substance $m$ having a high coefficient of friction is interposed between the outer surface of the sphere $a$ and the inner surface of the surrounding hollow sphere, and the said substance covers the greatest possible surface of the sphere $a$. The shells 3 are cut out at 5 so as to afford a certain freedom of movement for the ball joint, whereby an effective braking of the oscillations is afforded in all directions.

The several parts of the shock absorber are suitably assembled by means of a pivot pin 6 which is not subjected to reaction or to friction. The shells 1 are pierced at 15 with an aperture which is larger than the pin or bolt 6, thus allowing a sufficient freedom for the lateral oscillations.

The pressure between the friction parts is afforded by the spring 7 surrounding the bolt and tending to separate the two inner shells 1; the latter are suitably flattened at their top, thus providing bearing surfaces for the ends of the spring, and between which the latter is compressed. Due to the position of the bolt on a diameter of the sphere, one may employ a spring having a long stroke and whose pressure is substantially constant in spite of all variations in the vertical deflection resulting from the wear. The initial adjustment of the said shock absorber is effected with great facility, either by interposing a very thin strip between the two internal shells and not screwing up the device beyond a point which would prevent the withdrawal of the said strip, or by screwing tightly the nut 8 on the bolt 6, and then loosening the nut by a fraction of a revolution.

Figure 3:
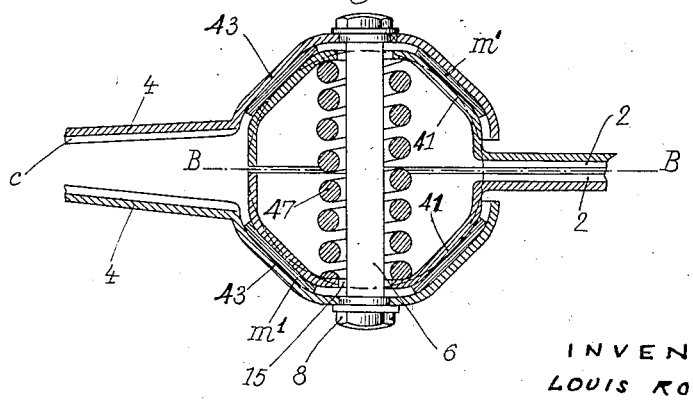
Fig 3 is a like view of a modification.
Figure 4:
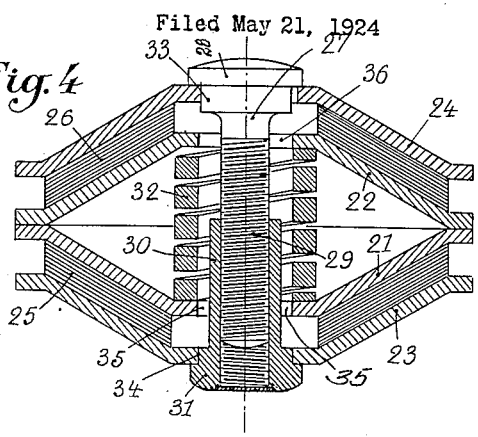
Fig. 4 is an axial cross section of a shock absorber embodying four similar shells.

In Fig. 3, the shells 41 and 43 have the form of a cone of revolution, the axis of the cone coinciding with that of the bolt 6. In this event the initial adjustment should allow a certain play in order that the inner shells 41 may move after the manner of a ball joint. For this purpose, a strip of the proper thickness is used, operating as above described. 47 is a spring analogous to the spring 7 in Fig. 1 and $m'$ is a substance having a high coefficient of friction.

In the embodiments shown in Figs. 4 to 10, the shock absorber comprises four similar conical shells 21, 22, 23, 24 which are preferably made of pressed sheet metal; all the shells are manufactured with the same matrices. The said shells are disposed in two groups, i. e. the internal group comprising the shells 21 and 22 juxtaposed at the base, and the external group comprising the shells 23 and 24, the shell 23 being disposed upon the shell 21 whilst the shell 24 is disposed upon the shell 22. Conical elements 25 and 26, in one or more parts are made of a substance having a proper coefficient of friction, selected with care, are interposed between the internal and external groups of shells, between the shells 21 and 23 and between the shells 22 and 24, respectively. The conical elements 25 and 26 may be loose or attached to the shells of either group. The said shells are pierced at the centre with circular apertures of the same diameter. The device is assembled by means of a central pivot pin or bolt 27 having the head 28 in contact with the shell 24 and a screw-threaded shank 29 cooperating with the assembling nut 30 whose head 31 presses upon the shell 23; the nut 30 forms preferably an elongated sheath.

The friction of the two groups of shells upon each other through the intermediary of the elements 25 and 26 is obtained by means of a spring 32 having a long stroke which surrounds the bolt 27 and is thus disposed within the chamber formed by the inner shells 21 and 22. The said spring is herein compressed and it acts to separate the shells 21 and 22 and to press them against the shells 23 and 24, respectively. As in the preceding case, a spring of long stroke is used in order to take up the wear of the friction parts, but without any appreciable change in the friction, and with this construction, the apparatus will practically remain properly adjusted in a continuous manner.

The spring 32 is so constructed and standardized that the desired state of compression can be had during the assembling, when the bases of the shells 21 and 22 are in contact, so that the device will thus be fluid-tight and no grit can enter. To adjust the device, or rather to take up the wear, the nut 30 is screwed upon the bolt 27 the rotation whereof is prevented during screwing, for instance by a nib on the bolt fitting into a groove in the said shell.

Upon the bolt 27 and the nut 30 are formed the shoulders 33 and 34 fitting in the apertures in shells 23 and 24 respectively; at 35 and 36, between the shells 21, 22 a certain play is provided which allows in certain cases for the lateral motion of the shock absorber arms, and this, independently of the elasticity of the said arms, aids in the proper working of the apparatus.

Due to the pressure of the spring 32, all risk of unscrewing of the nut 30 will be automatically eliminated, but obviously the said nut might be locked in a more effective manner, if required, by forming suitable streaks on the under surface of the head 31 and on the outer surface of the shell 23, or by like means.

Figure 5:
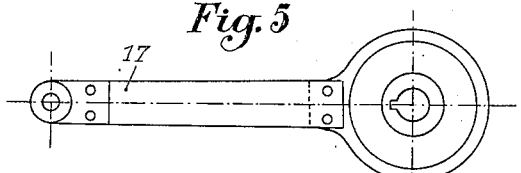
Figs. 5 and 6 are respectively a front view and a longitudial section of a shell with a separately secured arm.
Figure 6:

Figs. 5 and 6 illustrate a shell with a separately secured arm 17.

Figure 7:
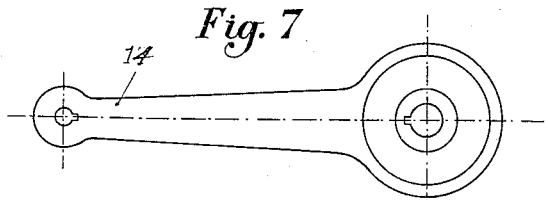
Figs. 7 and 8 are views analogous to Figs. 5 and 6, illustrating a shell which is pressed in one piece with the corresponding arm.
Figure 8:
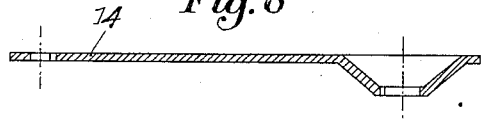

In Figs. 7 and 8 the arm 14 is made in one piece with the shell by pressing and this method of manufacture offers various advantages, especially that of a low cost.

Figure 9:
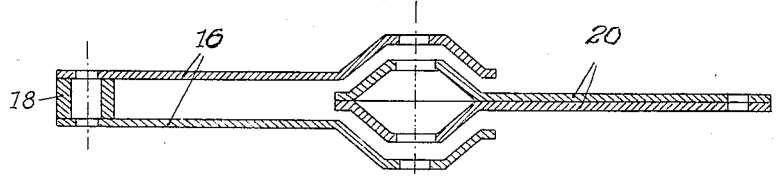
Fig. 9 is a section showing the relative disposition of four like shells, with the arms of the shock absorber situated in line with each other; each of the shells is supposed to be pressed in one piece with the corresponding arm.

Fig. 9 shows an arrangement of four shells of similar shape, each being formed together with its arm by pressing; the central apertures are larger in the inner shells than in the outer shells, thus allowing the lateral motion of the arms 16 and 20 when the bolt is not provided with the shoulders 33, 34 shown in Fig. 1. A spacing sleeve 18 is mounted between the ends of the arm 16 of the outer group of shells.

Figure 10:
Fig. 10 is a partial section showing a modification of the attachment of the arms of the outer shells.

In the modification, Fig. 10, the sleeve 18 is dispensed with; in this device the said arms of the outer group are suitably bent at 19 near the outer ends, so as to come into contact at the point of junction with the vehicle.

The arrangements shown in Figs. 4 to 10 are advantageous as regard the amount of the material used, labour and the necessary tools, since the four tapered shells of a shock absorber are made according to the same standard, and this will also facilitate the supply and the storage.

Figure 11:
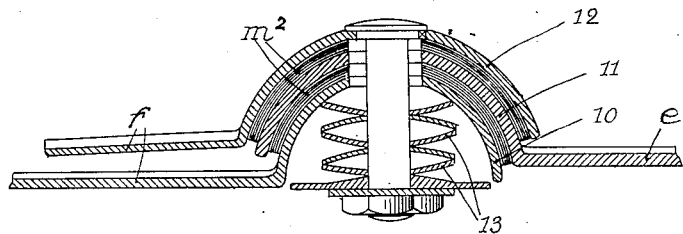
Fig. 11 shows another modification in which the shock absorber consists of half a group of shells.

Fig. 11 shows a modification of the said device, comprising a plurality of hemispherical elements or shells 10, 11, 12; the extensions $f$ of the shells 10 and 12 serve to form one arm of the device whilst the extension $e$ of the shell 11 forms the other arm. The device comprises two layers of material $m^2$ having a high coefficient of friction; the damping pressure is obtained by a set of concave spring washers 13.

In Figs. 12 to 17 is shown the end of one arm of the shock absorber mounted upon one of the two elements which are to be connected together by the said shock absorber. This connecting device is much like the main shock absorbing device, the arrangement shown in Fig. 12 being analogous to the device shown in Fig. 2, and the device shown in Fig. 13 being analogous to that of Fig. 3.

Figure 13:
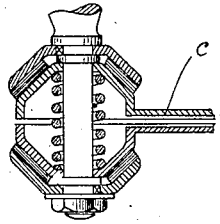
Figs. 12 to 17 show in axial section various arrangements for attaching the arms to the two parts which are connected together by the shock absorber.
Figure 12:
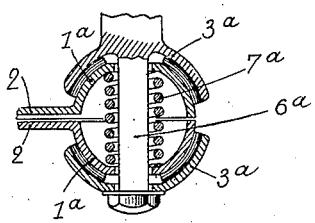
Figure 14:
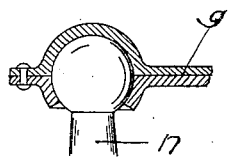
Figure 15:
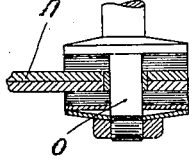
Figure 16:
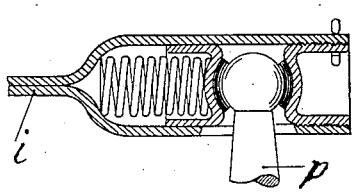

In both Figs. 12 and 13, the end of the arm $c$ is integral with the inner shells $1^a$ of the said connecting device, whilst the pivot pin $6^a$ is integral with one of the outer shells and also with the element to which the end of the arm $c$ is to be attached; the spring $7^a$ having a long stroke affords the proper contact. With the device shown in Fig. 13, the whole is guided in an approved manner.

Figs. 14 to 17 illustrate various arrangements used at the ends of the arms $g$, $h$, $i$, or $j$ of the main shock absorber; the pivot pin $n$, $o$, $p$ or $q$ is in all cases integral with the element to which the end of an arm is to be attached.

Figure 17:
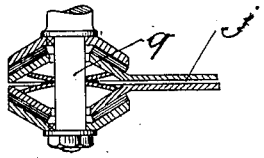

Obviously, the arrangements hereinbefore described are susceptible of various modifications without departing from the principle of the invention, and in particular, the compressible element which provides for the damping action may be constituted by one or more spiral springs or by concave spring washers, as shown in Figs. 11 and 17.

Having now described my invention what I claim as new and desire to secure by Letters Patent is:

1. A shock absorber comprising an outer hollow friction member and an inner hollow friction member within said outer member, central apertures being provided in said inner and outer members, two arms respectively secured to said inner and outer members, a bolt fitting exactly through the apertures in one of said two members and extending with a wide play through the apertures of the other member in order to allow said two members to move respectively to each each other in the manner of a ball and socket joint as well about the axis of said bolt as about any other axis passing through the middle of the shock absorber, said bolt cooperating with yielding means located within said inner member for pressing the inner and outer members against one another.

2. A shock absorber comprising an outer hollow friction member and an inner hollow friction member within said outer member having the same shape and size as said outer member, central apertures of the same diameter being provided in said inner and outer members, two arms respectively secured to said inner and outer members, a bolt extending with a wide play through the apertures of one of said members and collars provided on said bolt and fitting exactly in the apertures of the other member, in order to allow said two members to move respectively to each other in the manner of a ball and socket joint as well about the axis of said bolt as about any other axis passing through the middle of the shock absorber, said bolt cooperating with yielding means located within said inner member for pressing the inner and outer members against one another.

3. A shock absorber comprising an outer hollow friction member having conical surfaces and an inner hollow friction member within said outer member having conical surfaces parallel with the conical surfaces of said outer member, central apertures being provided in said inner and outer members, two arms respectively secured to said inner and outer members, a bolt located along the common axis of said conical surfaces fitting exactly through the apertures in one of said two members and extending with a wide play through the apertures of the other member in order to allow said two members to move respectively to each other in the manner of a ball and socket joint as well about the axis of said bolt as about any other axis passing through the middle of the shock absorber, said bolt cooperating with yielding means located within said inner member and with a nut provided with a long sheath for pressing the inner and outer members against one another.

In testimony whereof I have signed my name to this specification.

LOUIS ROUANET.